(12) United States Patent
Persson

(10) Patent No.: US 7,917,472 B2
(45) Date of Patent: Mar. 29, 2011

(54) METHOD, SYSTEM AND COMPUTER-READABLE MEDIA FOR BACKING UP INFORMATION CONTAINED IN A DATABASE

(76) Inventor: Mats Stefan Persson, La Jolla, CA (US)

( * ) Notice: Subject to any disclaimer, the term of this patent is extended or adjusted under 35 U.S.C. 154(b) by 383 days.

(21) Appl. No.: 12/290,881

(22) Filed: Nov. 3, 2008

(65) Prior Publication Data

US 2010/0114828 A1   May 6, 2010

(51) Int. Cl.
*G06F 17/30* (2006.01)
(52) U.S. Cl. ........................................ 707/640
(58) Field of Classification Search .............. 707/640, 707/644–654
See application file for complete search history.

(56) References Cited

U.S. PATENT DOCUMENTS

| | | | |
|---|---|---|---|
| 6,172,533 B1 * | 1/2001 | Fransson et al. ............. | 327/7 |
| 7,181,461 B2 * | 2/2007 | Bonner et al. ............... | 717/127 |
| 7,844,577 B2 * | 11/2010 | Becker et al. ............... | 707/646 |
| 2003/0065687 A1 * | 4/2003 | Momiji et al. ............... | 707/204 |
| 2006/0200500 A1 * | 9/2006 | Baek et al. .................. | 707/202 |

* cited by examiner

Primary Examiner — Cam-Linh Nguyen
(74) *Attorney, Agent, or Firm* — Patrick Reilly

(57) ABSTRACT

A system, computer-readable media and method for backup one or more databases and restoring one or more databases using incremental backups are provided. Persistent collection objects are generated in the process of performing a database backup. A collection objects may order records, e.g., objects, in relation to and within pluralities of records. These pluralities of records may be referred to, or organized as, pages or containers of pages, comprising software objects. The persistent database backup collection object may include a time and date of a generation of an incremental backup database by a distinguishable and specific database archiving process ("backup event"), an event number of an incremental backup generation, one or more database identifiers, one or more container identifiers, and/or identifiers of individual records, e.g., object identifiers.

15 Claims, 13 Drawing Sheets

METHOD, SYSTEM AND COMPUTER-READABLE MEDIA FOR BACKING UP INFORMATION CONTAINED IN A DATABASE

FIELD OF THE INVENTION

The present invention relates to information technology systems that maintain databases and enable the generation of backup copies (hereafter "backups") of information contained within databases. The present invention more particularly relates to methods and systems for generating backups of databases and restoring databases from back up copies.

BACKGROUND OF THE INVENTION

A database often refers to an ordered assembly of data on which transactions are performed. Prior art database systems often employ methods to process transactions in such a manner that a database may be restored to a previous state in the event of a system failure such as a communications network failure or a computational system crash. To achieve consistency and durability of a database, certain prior art information technology systems perform database backup operations wherein copies of data stored in one or more databases are stored as separate assemblies of data, i.e., backup databases. In case of a failure, these backup databases ("backups") are used recover an originating database from which the data of the backed database was copied before the failure.

The prior art further includes methods and systems that generate incremental backups. After a full backup process wherein a backup of the full database is generated, a subsequent incremental backup process is employed to generate an incremental backup and capture an image of only the data that has changed since the most recent full backup was performed. It is understood that the data of the backup database, and information describing the data and organization of the comprising database, may be compressed for storage and later uncompressed for database restoration operations.

The generation of incremental backups can continue indefinitely, wherein a continuous number of subsequent incremental backups may be performed and created, wherein each incremental backup includes information describing changes made to the comprising database that have occurred after the most recently generated incremental backup.

In the prior art recovery operations, the most recently generated full backup may be first restored in a process of restoring a database in a memory. The database changes documented in the first incremental backup may then distributed to the appropriate memory locations within the comprising memory to reinstantiate the database substantially to the state that the source database was at the time that the first incremental backup was initiated. This prior art process may then be successively iterated for each of the incremental backups in an order in which the series of incremental backups were generated.

In certain prior art computational systems, a full backup process may include gathering all files and directories and their content from a file system and writing the gathered information to a memory. An incremental backup that follows may be limited to writing out information that is new or has been modified since a most recent full backup, wherein the information may describe changes in database structure, organization, and/or relationships of data within the database. The common modifications to a database include addition, removal and renaming of software objects, records, files and sub-directories, as well as content update of an existing object, record or file in the instant database.

The prior art further includes federated databases wherein multiple or pluralities of databases are maintained within a computer or a communications network, such as by a plurality of servers communicatively coupled with, or comprised within, the Internet. Various prior art federated databases include one or more relational databases, object oriented databases, network model databases and/or hierarchical databases.

Yet the prior art fails to optimally provide for the efficient backup and restoration of software records or software objects as incrementally stored in relation to a time of an incremental backup and/or particular database backups, either in isolation or as an aspect of a federated database.

SUMMARY OF THE INVENTION

Towards this object and other objects that will be made obvious in light of this disclosure, a first version of the method of the present invention provides a system for performing incremental database backups and restoring at least one database by reference to at least one incremental database backup.

In a first preferred method of the present invention, or "first method" one or more persistent reference objects are generated in the process of performing a database backup. A first persistent reference object may order records, e.g., objects, in relation to and within pluralities of records. These pluralities of records may be referred to or organizes as pages, and one, many or all records comprised within one or more pages may be, in certain alternate preferred embodiments of the first method, software objects. In addition, pluralities of pages may be referred to or organized as or within containers.

In various alternate preferred embodiments of the method of the present invention, one or more persistent objects may be objects referenced therein according to a time and date of a generation of an incremental backup database by a distinguishable and specific database archiving process ("backup event"), an event number of an incremental backup generation, one or more database identifiers, one or more container identifiers, and/or identifiers of individual records, e.g., object identifiers.

A second and alternate preferred method of the present invention (or "second method") provides a method of backing up data contained in a federated software database that includes a plurality of software databases, wherein each database may maintain a plurality of pages of records, e.g., software objects. The second method includes one or more of the aspects of (a.) creating an initial backup (or "full backup") populated with a full backup of all the currently stored data of the federated database or at least one database; (b.) setting a backup event counter to an initial event value; (c.) creating an initial backup collection associated with the initial event value, wherein each backed-up object is sorted and ordered by the initial event value, database identifier, container identifier, page identifier, and/or record identifier; (d.) updating a plurality of records of the federated database; (e.) updating the backup event counter to a first event value; (f.) generating a first incremental backup by storing each page having record that was updated after the initial backup process into a first incremental backup; and (g.) creating a first incremental backup collection associated with the first event value, wherein each backed-up record of the first incremental backup is sorted by event number, database identifier, container identifier, page identifier, and/or record identifier. The federated database, an individual database or a plurality of databases, one or more containers, one or more pages, and one or more records may be restored in various alternate preferred embodiments of the second method by a computational system with reference to the initial backup collection and the first incremental backup collection.

It is understood that in certain preferred alternate embodiments of the present invention one, a plurality, or all of the records are software objects.

A first preferred embodiment of the present invention comprises a computational system or network configured to practice one or more aspects of the method of the present invention as disclosed herein. Certain yet alternate preferred embodiments of the present invention comprise a computer-readable media having machine-executable instructions that may direct a computational system or network to practice one or more aspects of the method of the present invention as disclosed herein.

The foregoing and other objects, features and advantages will be apparent from the following description of the preferred embodiment of the invention as illustrated in the accompanying drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 7,386,755 entitled "Backup copying and restoration processing in a storage subsystem"; U.S. Pat. No. 7,370,222 entitled "External storage and data recovery method for external storage as well as program"; U.S. Pat. No. 7,305,584 entitled "Data restoring method and an apparatus using journal data and an identification information"; U.S. Pat. No. 7,305,421 entitled "Parallelized redo-only logging and recovery for highly available main memory database systems"; U.S. Pat. No. 7,251,749, entitled "Efficient true image recovery of data from full, differential, and incremental backups"; U.S. Pat. No. 7,243,256 entitled "External storage and data recovery method for external storage as well as program"; U.S. Pat. No. 7,222,133 entitled "Method for reducing database recovery time"; U.S. Pat. No. 7,185,227 entitled "restoring method and an apparatus using journal data and an identification information"; U.S. Pat. No. 6,981,177 entitled "Method and system for disaster recovery"; U.S. Pat. No. 6,038,569 entitled "System for data structure loading with concurrent image copy"; U.S. Pat. No. 5,794,242 entitled "Temporally and spatially organized database"; U.S. Pat. No. 5,754,782 entitled "System and method for backing up and restoring groupware documents"; and United States Patent Application Publication No. 20080065591 entitled "Configurable software database parallel query system and method", by Inventor Guzenda, Leon, published on Mar. 13, 2008 are incorporated herein by reference in their entirety and for all purposes.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
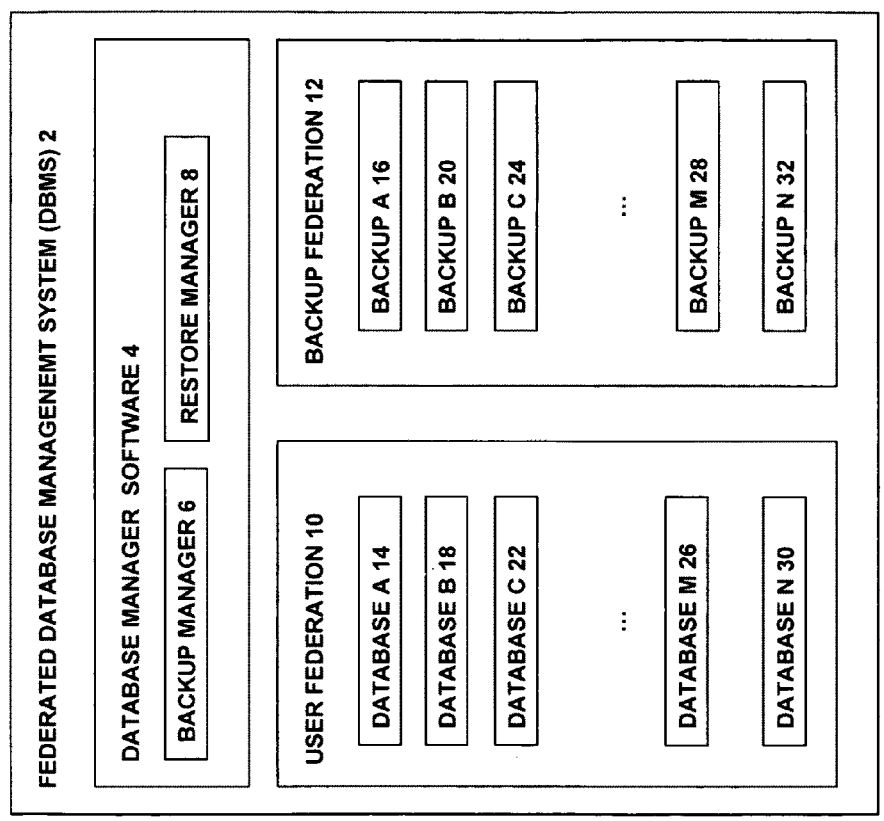
FIG. 1 illustrates a federated database management system in accordance with the method of the present invention and comprising databases and backup databases.

Referring now generally to the Figures and particularly to FIG. 1, FIG. 1 is an illustration of the federated database management system (hereafter, "DBMS") 2 that includes a database manager 4 comprising a backup manager 6 and a restore manager 8. The database manager 4 operates on at least two federations of databases, e.g., the user federation 10 and the backup federation 12. The user federation 10 includes a plurality of databases 14, 18, 11, 26, & 30, and the backup federation 12 includes a plurality of backup databases 16, 20, 24, 28 & 32 (hereafter "backups" 16, 20, 24, 28 & 32). Each database 14, 18, 11, 26, & 30 in the user federation 10 corresponds to a backup 16, 20, 24, 28 & 32 in the backup federation 12. For example, the backup information for database A 14 is stored in backup A 16.

Figure 2:
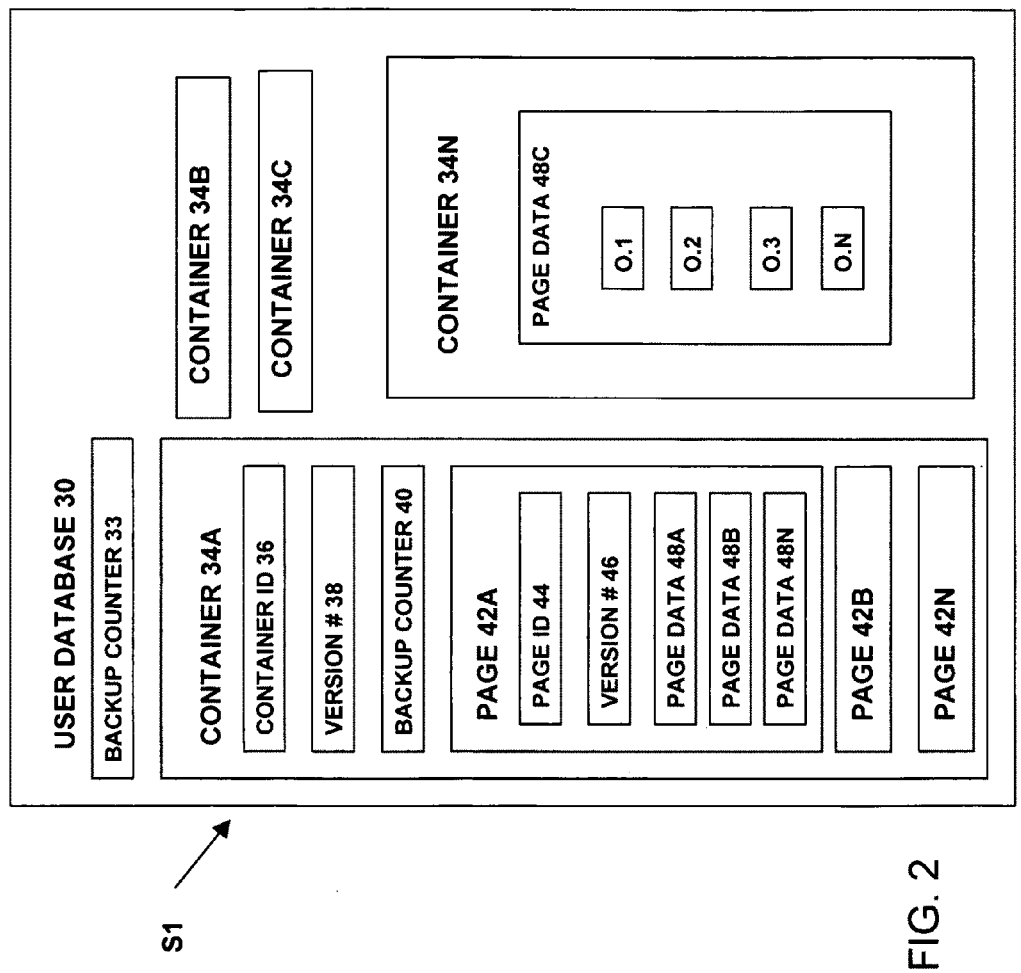
FIG. 2 illustrates a content database schema of at least one database of the federated database management system of FIG. 1.

Referring now generally to the Figures and particularly to FIG. 2, FIG. 2 illustrates a schema S1 of a user database 30 of the user federation 10. It is understood that one or more other databases 14, 18, 22, 26 & 30 of the user federation 10 may be organized according to the schema S1.

The user database 30 includes a backup counter 33, and a plurality of containers 34A, 34B, 34C & 34N. Taking for example container 34A, it is depicted that the container 34A includes of a container ID 36, a version number 38, a backup counter 40, and a plurality of pages. 42A-42N. Taking for example page 42A, it is depicted that a page contains a page ID 44, a version number 46 and a page data 48A-48N. As shown in the representation of page data 48N, each page data 48A-48N includes software objects O.1-O.N.

Figure 3:
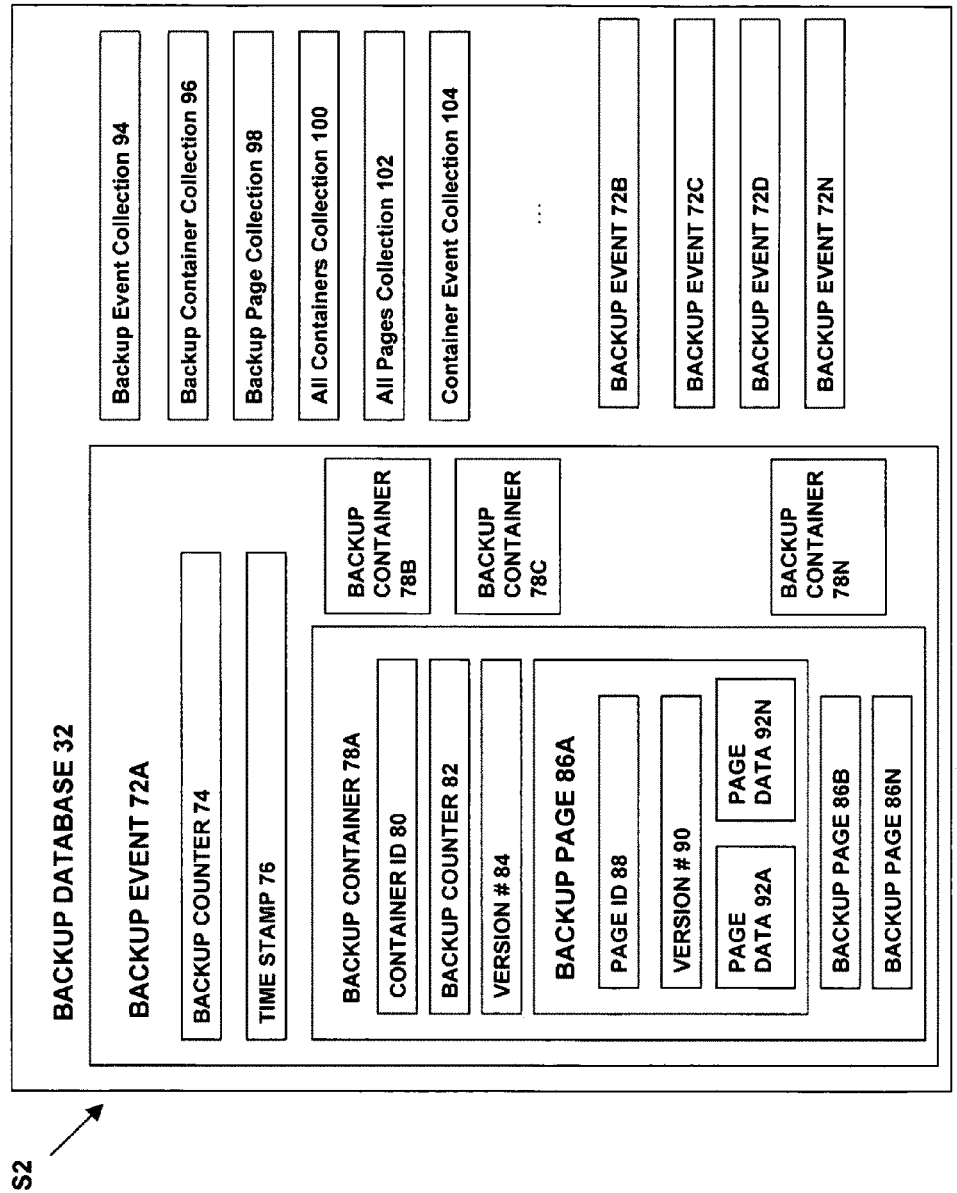
FIG. 3 illustrates a backup database schema of at least one backup database of the federated database management system of FIG. 1.

Referring now generally to the Figures and particularly to FIG. 3, FIG. 3 illustrates a backup schema S2 of a first backup database 32 in the backup federation 12. It is understood that each backup 16, 20, 24, 28 & 32 may optionally be organized according the backup schema S2.

The first backup database 32 includes a plurality of backup event objects 72A-72N and a plurality of backup persistent collections 94-104. Referring to the first backup event object 72A as an exemplary event object representative of the plurality of backup event objects 72A-72N, first backup event object 72A includes a backup counter 74, a time stamp 76, and a plurality of backup containers 78A-78N. Each backup container 78A-78N includes a backup container ID 80, a backup counter 82, a version number 84, and a plurality of backup pages 86A-86N. Referring to the first backup page 86A as an exemplary backup page representative of the plurality of backup pages 86A-86N, the first backup page 86A includes a backup page ID 88, a version number 90, and a plurality of page data 92A-92N. The six persistent collections 94-104 include a backup event collection 94, a backup collection 96, a backup page collection 98, a collection of all containers 100, a collection of all pages 102, and a container event collection 104. A backup event collection 94 stores backup events 72 sorted by an associated time stamp. A backup container collection 96 stores backup containers 78A-78N sorted by backup container ID 80. The backup page collection 98 stores the backup pages 86A-86N optionally sorted by page ID 88. The all containers collection 100 stores backup containers 78A-78N such as backup container 78 sorted by the backup container ID 80 and the time stamp 76. The all pages collection 102 stores backup pages 86A-86N such as one or more backup pages 86A-86N optionally sorted by an associated container ID 80, page ID 88, and/or time stamp 76. The backup container event collection 104 stores backup containers 78A-78N like backup container 78A sorted by time stamp 76 and container ID 80.

Figure 4:
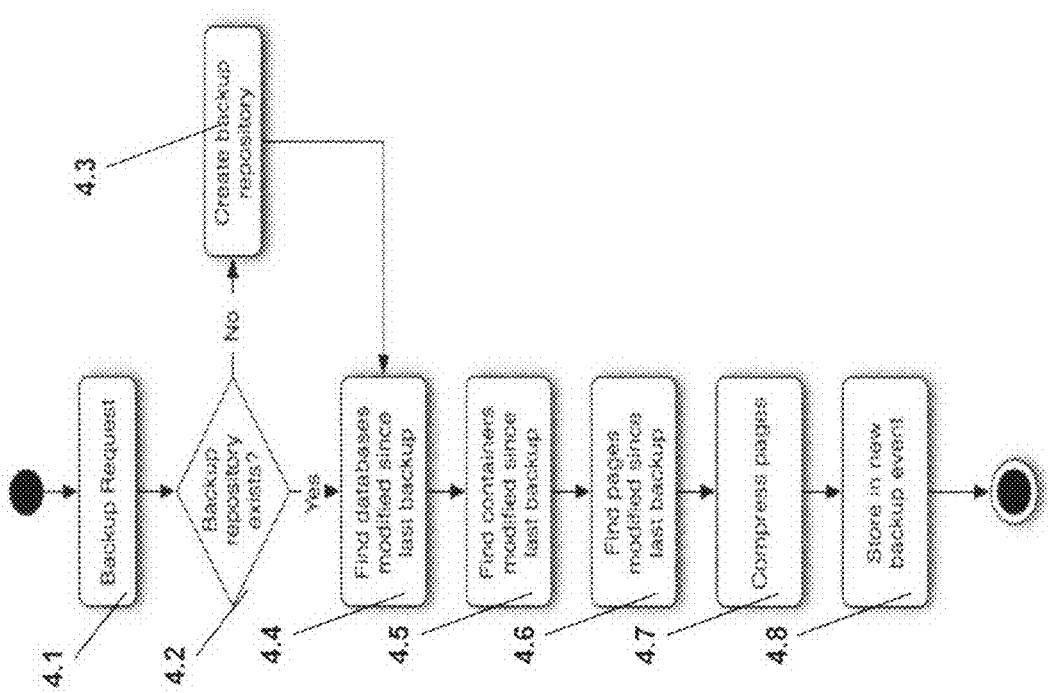
FIG. 4 illustrates a database backup procedure in accordance with the method of the present invention.

Referring now generally to the Figures and particularly to FIG. 4, FIG. 4 is a flow chart that shows the process by which an incremental backup is made of a user databases 14, 18, 22, 26 & 30 managed by the DBMS 2. In step 4.1, a backup request is issued or received by the DBMS 2. In step 4.2, the DBMS 2 determines whether a backup database already exists that includes all modifications made to selected databases 14, 18, 22, 26 & 30 since the most recent backup event 72A. In step 4.3, a backup database N 32 is created when the DBMS 2 determines in step 4.2 that a backup database N 32 that includes all modifications made to the selected database N 30 since the most recent backup event does not exist. In step 4.4, the DBMS 2 searches all databases 14, 18, 22, 26 & 30 to identify and select those databases 14, 18, 22, 26 & 30 modified since the last backup event object 72A was generated. In step 4.5, the DBMS 2 searches all container collections 100 to create a set of all containers for a selected user database 14, 18, 22, 26 & 30 modified since the last backup event 72A was created. In step 4.6, the DBMS 2 searches an all pages collection 102 to determines the set of all pages 42A-42N for each of these containers 78A-78N of the selected database 14, 18, 22, 26 & 30 that have been modified since the last backup event object 72A was generated. In step 4.7, these pages 42A-42N having new modifications are compressed. In step 4.8, the compressed pages 42A-42N are stored in the backup database 32 inside a backup event object 72B.

Figure 5:
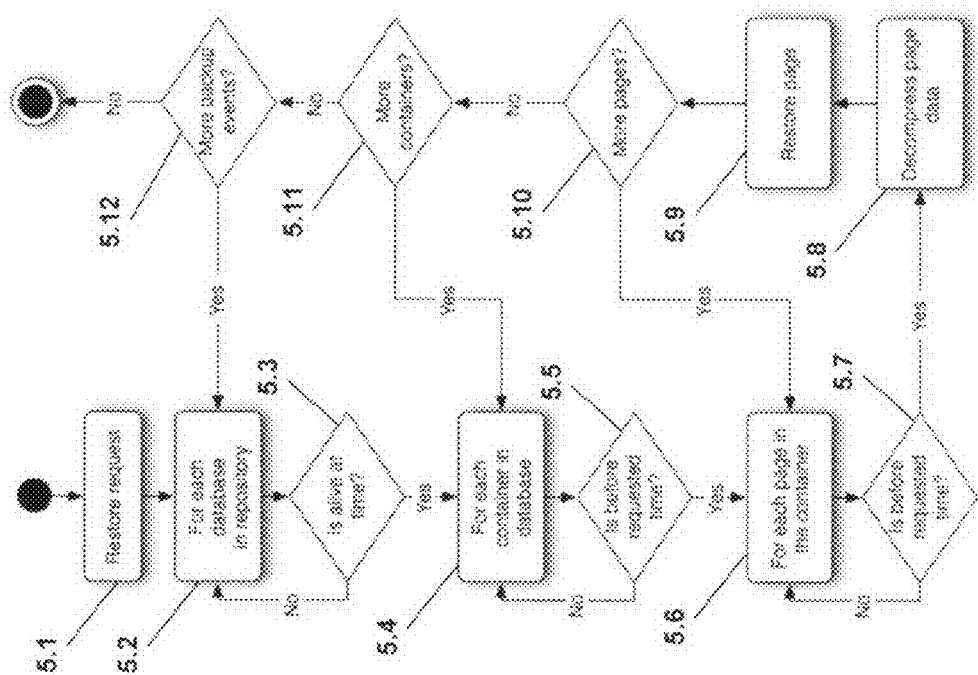
FIG. 5 illustrates a database restore procedure in accordance with the method of the present invention.

Referring now generally to the Figures and particularly to FIG. 5, FIG. 5 is a flow chart that shows the process by which one or more user databases 14, 18, 22, 26 & 30 managed by the DBMS 2 is restored via a backup operation. In step 5.1, a restore request is issued or received by the DBMS 2 and received by the restore manager 8, wherein the restore request cites a given time T and/or a backup counter value. In steps 5.2-5.12 each user backup database 16, 20, 24, 28 & 32 of the backup federation 12 is considered for restoration by comparing the time T and/or the backup counter value of the restore request of step 5.1. In step 5.3, an individual backup database 16, 20, 24, 28 & 32 is selected and examined by the restore manager 8 to determine whether it was present at the restore request time T. In step 5.4, each backup container 78A-78N of the individual backup 16, 20, 24, 28 & 32 selected in the most recent execution of step 5.2 is examined. In step 5.5, the DBMS 2 determines whether the backup container 78 of the backup 16, 20, 24, 28 & 32 selected in step 5.3 was present at the restore request time T. In step 5.6, each page 86 in the container 78 selected in step 5.6 is examined. The DBMS 2 determines in step 5.7 whether a specific page 86A-86N was present at the restore request time T. In step 5.8, the page 86 is optionally decompressed. In step 5.9, the selected page 86A-86N is restored in the user database 14, 18, 22, 26 or 30 that corresponds to the backup 16, 20, 24, 28 & 32 selected in the most recent execution of step 5.2. In step 5.10, the restoration process loops back if there are more pages 86A-86N of the backup selected in step 5.2 to examine. In step 5.11, the restoration process loops back if there are more containers 78 of the backup selected in step 5.2 to examine. In step 5.12, the restoration process loops back if there are more backup events 72 to process.

Figure 6:
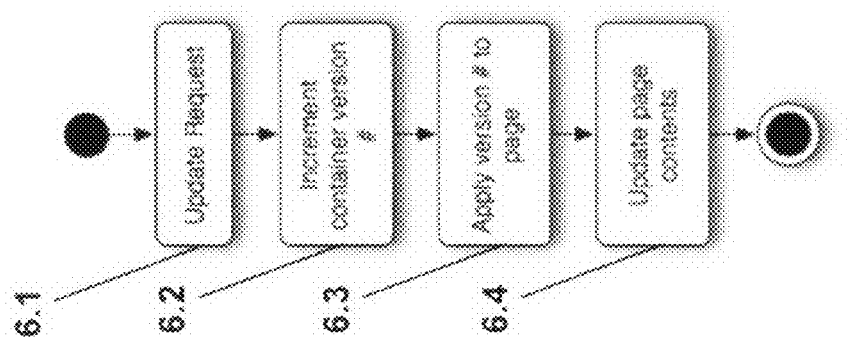
FIG. 6 illustrates the database update procedure in accordance with the method of the present invention.

Referring now generally to the Figures and particularly to FIG. 6, FIG. 6 is a flow chart that shows the process in which user database 14, 18, 22, 26 or 30, managed by the DBMS 2, is updated. In step 6.1, a request is sent to the DBMS 2 to update the contents of a page 42A-42N in a specific database 14, 18, 22, 26 or 30. In an exemplary execution of step 6.2, a version number 38 of a container 34A-34N of the page 42 is incremented by one. In step 6.3, a new version number 38 of the selected container 34A-34N is applied to the version number 46 of the selected page 42A-42N. In step 6.4, the page data 48A-48N of the selected page 42A-42N are updated.

Figure 7:
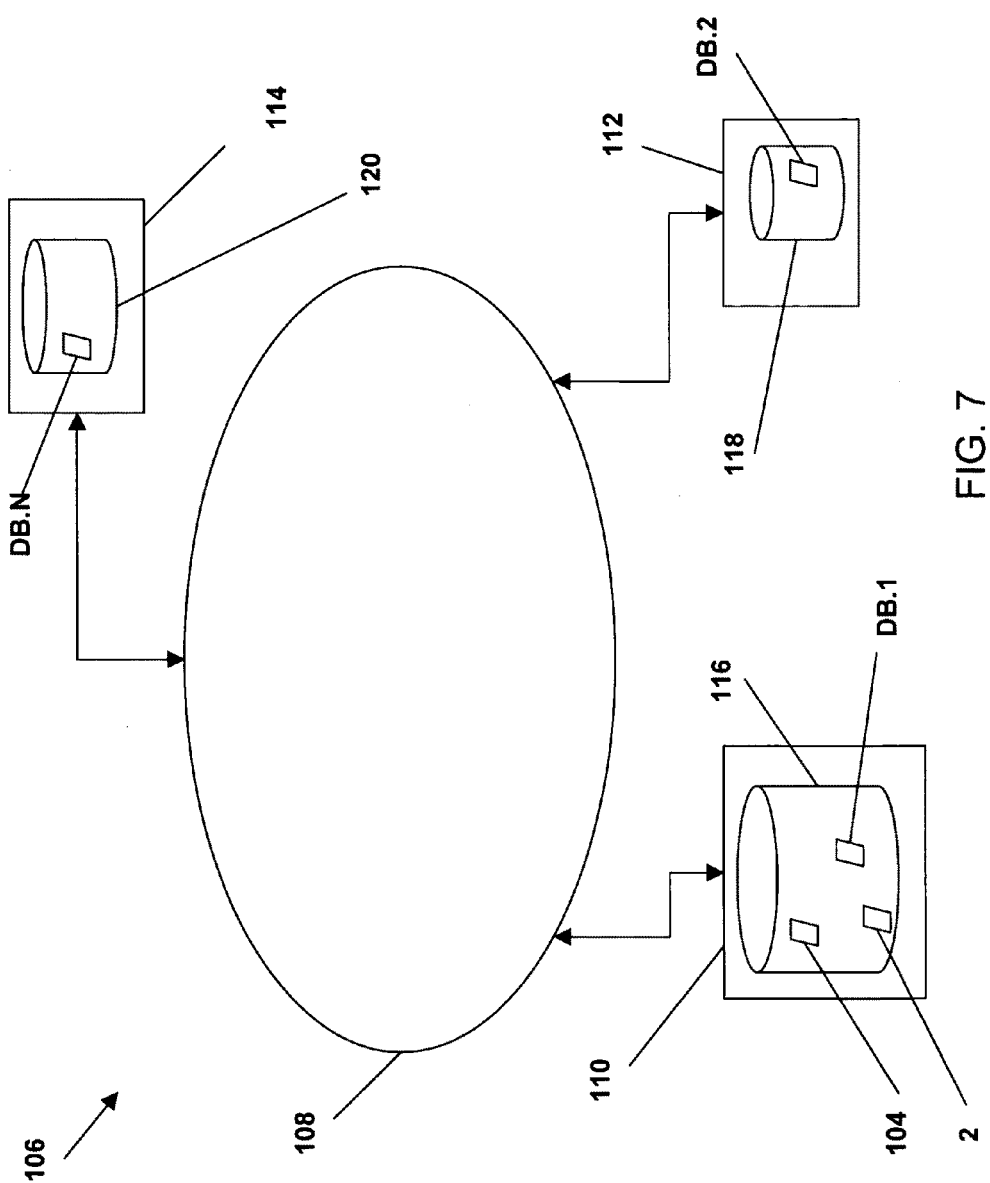
FIG. 7 illustrates an electronic communications network used by the database management system of FIG. 1 and in accordance with the method of the present invention.

Referring now generally to the Figures and particularly to FIG. 7, FIG. 7 is an illustration of the electronic communications network 106 comprising the Internet 108 and a plurality of computers 110, 112 & 114. A federated computer 110 includes the federated database manager software 4 comprised within a first database management system 116, or "first DBMS" 116. A second computer 112 includes a second DBMS 118, and a third computer 114 includes a third DBMS 120. The federated database manager software 4 communicates with and supports access to and the maintenance of a plurality of DBMS 116, 118 & 120 and a plurality of databases DB.1-DB.N.

The federated computer 110, the second computer 112 and/or the third computer 114 may in various alternate preferred embodiments of the method of the present invention be or comprise a computer system, such as (a.) a VAIO FS8900™ notebook computer marketed by Sony Corporation of America, of New York City, N.Y., (b.) a SUN SPARC-SERVER computer workstation marketed by Sun Microsystems of Santa Clara, Calif. running LINUX or UNIX operating system; (c.) a personal computer configured for running WINDOWS XP™ or VISTA™ operating system marketed by Microsoft Corporation of Redmond, Wash.; (d.) a PowerBook G4™ personal computer as marketed by Apple Computer of Cupertino, Calif.; (e.) an iPhone™ cellular telephone as marketed by Apple Computer of Cupertino, Calif.; or (f.) a personal digital assistant.

Figure 8:
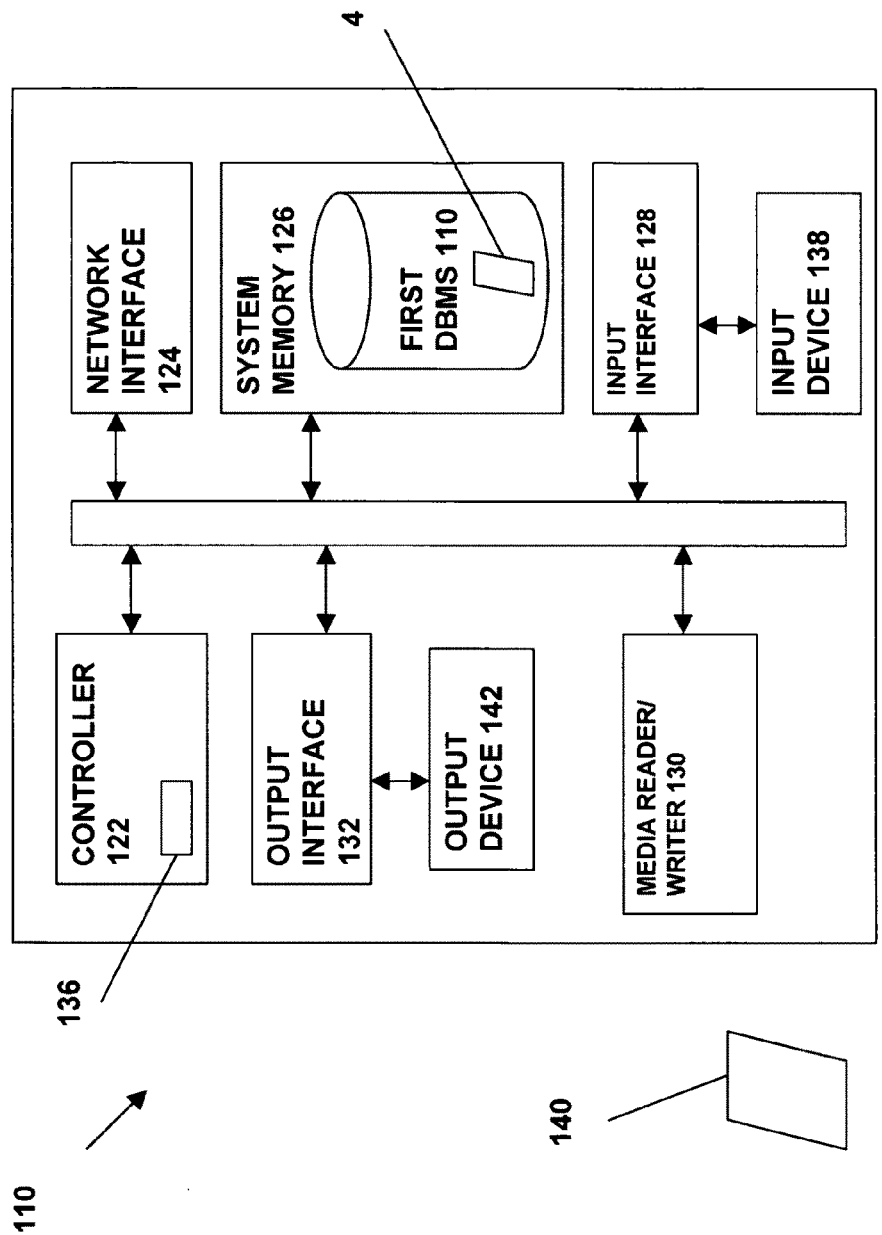
FIG. 8 illustrates a computer of the network of FIG. 7.

Referring now generally to the Figures and particularly to FIG. 8, FIG. 8 is a schematic of the first computer 110 wherein a controller 122 is bi-directionally communicatively coupled with a network interface 124, a system memory 126, an input device interface 128, a media reader/writer 130, and an output device interface 132 by an internal communications bus 134. The controller 122 may be or comprise an Intel Pentium™ microprocessor and includes a real time clock pulse circuit 136. The network interface 124 bi-directionally communicatively couples the federated computer 110 with the Internet 104. The input device interface 128 communicatively couples an input device 138 with the controller 122 via the internal communications bus 134. The input device 138 may be or comprise a computer keyboard, a computer mouse, a computer track-ball, and/or a computer mouse pad. The media reader/writer 130 is configured to read and write computer-readable data and machine-readable commands from a digital media 140. The output device interface 132 communicatively couples an output device 142 with the controller 122 via the internal communications bus 134. The output device 142 may be or comprise an electronic video display device or digital television. It is understood that additional computers 112 & 114 of the network 106 may comprise one, some, or all of the elements and aspects 122-138 & 142 of the federated computer 110.

The digital media 140 is a computer-readable medium that may comprises machine-readable instructions which when executed by the computer to cause one or more computers 110, 112 or 114 to perform one or more steps as described in the Figures and enabled by the present disclosure. The term "computer-readable medium" as used herein refers to any suitable medium known in the art that participates in providing instructions to the network for execution. Such a medium may take many forms, including but not limited to, non-volatile media, and volatile media. Non-volatile media includes, for example, optical or magnetic disks, tapes and thumb drives. Volatile media includes dynamic memory.

The federated computer 10 and the network 106 are each configured to practice one or more aspects of the method of the present invention as disclosed herein. The computer-readable media 140 contains machine-executable instructions that may direct the federated computer 110 the network 106 to practice one or more aspects of the method of the present invention as disclosed herein.

Common forms of computer-readable media include, for example, a floppy disk, a flexible disk, hard disk, magnetic tape, or any other magnetic medium, a CD-ROM, any other optical medium, RAM, a PROM, and EPROM, a FLASH-EPROM, any other memory chip or cartridge, a carrier wave as described hereinafter, or any other suitable medium known in the art from which a computer can read machine executable instructions.

Various forms of computer readable media 140 may be involved in carrying one or more sequences of one or more instructions to the network for execution. For example, the instructions may initially be carried on a magnetic disk of a remote computer 112 or 114. The remote computer 112 or 114 can load the instructions into its dynamic solid-state electronic memory and send the instructions to the federated computer 110 via the electronic communications network 106.

Figure 9:
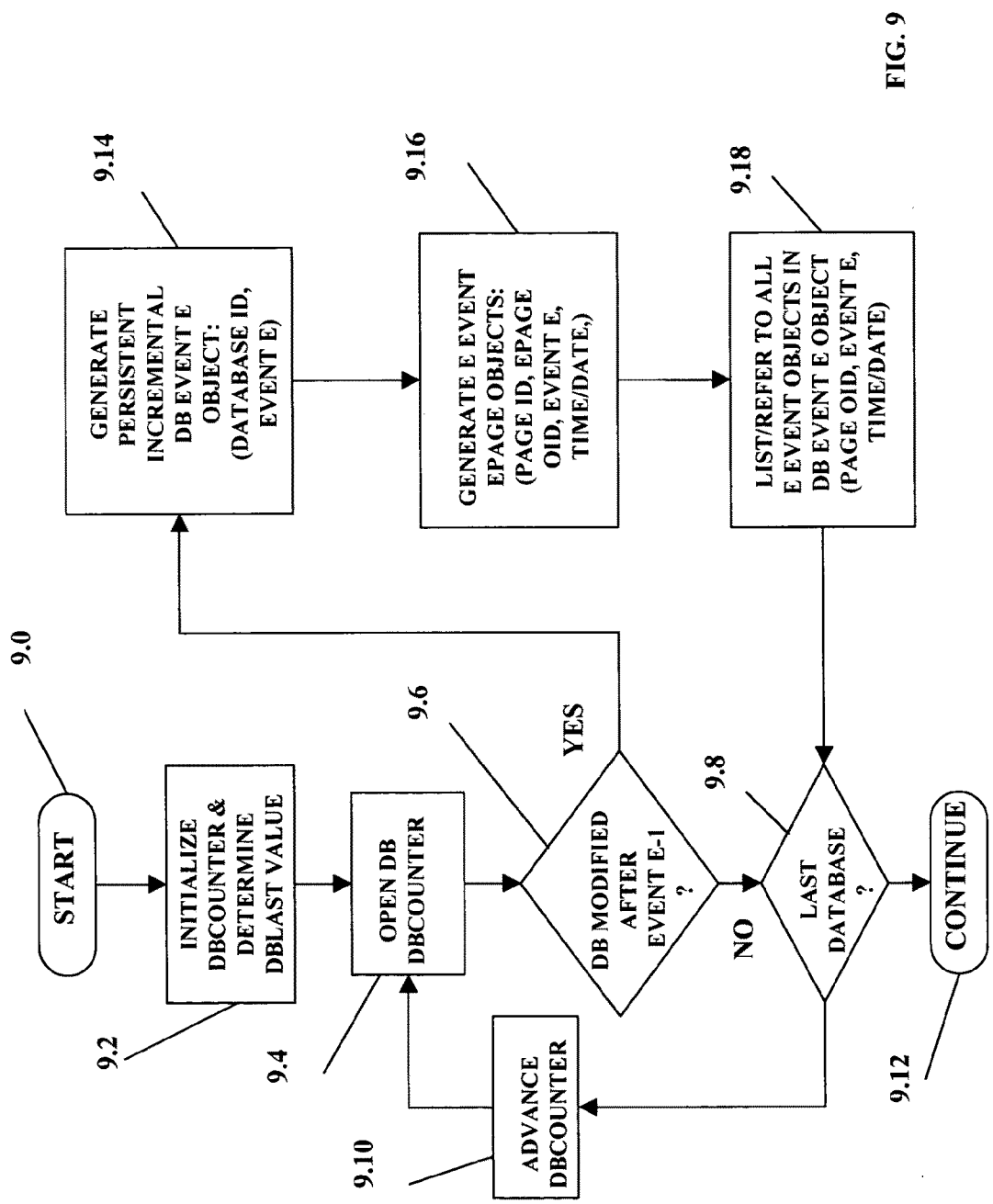
FIG. 9 is a flowchart of optional operations of the DBMS of FIG. 1 wherein persistent database event collection objects may be generated as a result of a backup event process.

FIGS. 9 through 12 are flowcharts of that include optional aspects of a second alternate preferred embodiment of the method of the present invention. Referring now generally to the Figures and particularly to FIG. 9, FIG. 9 is a flowchart of optional operations of the DBMS 2 wherein persistent database event collection objects DB EVENT E 148.A are generated as a result of a backup event process E. In step 9.2 a database counter DBCOUNTER 146 is initialized to a beginning database identification value of a plurality of databases, and the last database identification value DBLAST of the plurality of databases is determined. For example, the plurality of databases may include one thousand databases, wherein each database is sequentially assigned a unique identification value of the whole number series from 000 to 999, and in step 9.2 the database counter DBCOUNTER 146 is initialized to the whole number 000 and the last database identification value DBLAST is set to equal 999 by the DBMS 2.

In step 9.4 a database having an identification value equal to the current value of the database counter DBCOUNTER 146 is opened by the DBMS 2. The opened database of step 9.4 is then examined by the DBMS 2 in step 9.6 to determine whether any element of the opened database (e.g., an object, record, page or container) has been modified after a most recent backup process E-1. If the database selected in the most recent execution of step 9.4 is determined in step 9.6 to not have been updated or modified since the execution of backup process E-1, the DBMS 2 proceeds on from step 9.6 to step 9.8 to determine whether the database counter DBCOUNTER 146 is equal to the last database identification value DBLAST, whereby the DBMS 2 determines whether each and every database of the plurality of databases has been examined in an execution of steps 9.4 and 9.6.

When the DBMS 2 determines in step 9.8 that the database counter DBCOUNTER 146 is not equal to the last database identification value DBLAST, the DBMS 2 proceeds from step 9.8 to step 9.10 to advance the database counter DBCOUNTER 146 to a value closer to the last database identification value DBLAST (e.g., increment or decrement the database counter DBCOUNTER 146), and from step 9.10 to a succeeding execution of step 9.4. When the DBMS 2 determines in step 9.8 that the database counter DBCOUNTER 146 is equal to the last database identification value DBLAST, the DBMS 2 proceeds from step 9.8 to step 9.12 and to perform alternate computational operations.

If the database selected in the most recent execution of step 9.4 is determined in step 9.6 to have been updated or modified since the execution of the earlier backup process E-1, the DBMS 2 proceeds on from step 9.6 to step 9.14 and to generate a persistent incremental database backup collection object DB EVENT E 148.A that contains an identifier of the database examined in step 9.6 and an identifier of the current backup event E. In step 9.16 page revision objects EPAGE 144.A are generated, wherein a separate page revision object EPAGE 144.A is generated for each page of the database DBCOUNTER 146 that has been updated after the performance of the most recent backup event E-1 (e.g., when an object O.1-O.N of the page has been updated after the execution of the earlier backup event E-1), wherein each EPAGE 144.A-144.N includes (1.) an identifier of the modified page of the database PAGE ID; (2.) an object identifier EPAGE OID of the newly generated page revision object EPAGE 144.A itself; (3.) an identifier of the current backup event process EVENT E; (4.) an optional time date stamp of the time and date that the page was most recently updated; and (5.) the contents of the page at the time of the execution of the current backup event process E (e.g., all of the objects O.1-O.N and all other data comprised within the page). In step 9.16 the object identifiers EPAGE OID's and/or the page objects EPAGE's generated in step 9.16 are included in the persistent incremental database backup event collection object DB EVENT E 148.A generated in step 9.14. The DBMS 2 proceeds on from step 9.18 to step 9.8.

The persistent incremental database backup event collection object DB EVENT E 148.A generated in the process of FIG. 9 may be stored in the system memory 126 of the federated computer 110.

Figure 10:
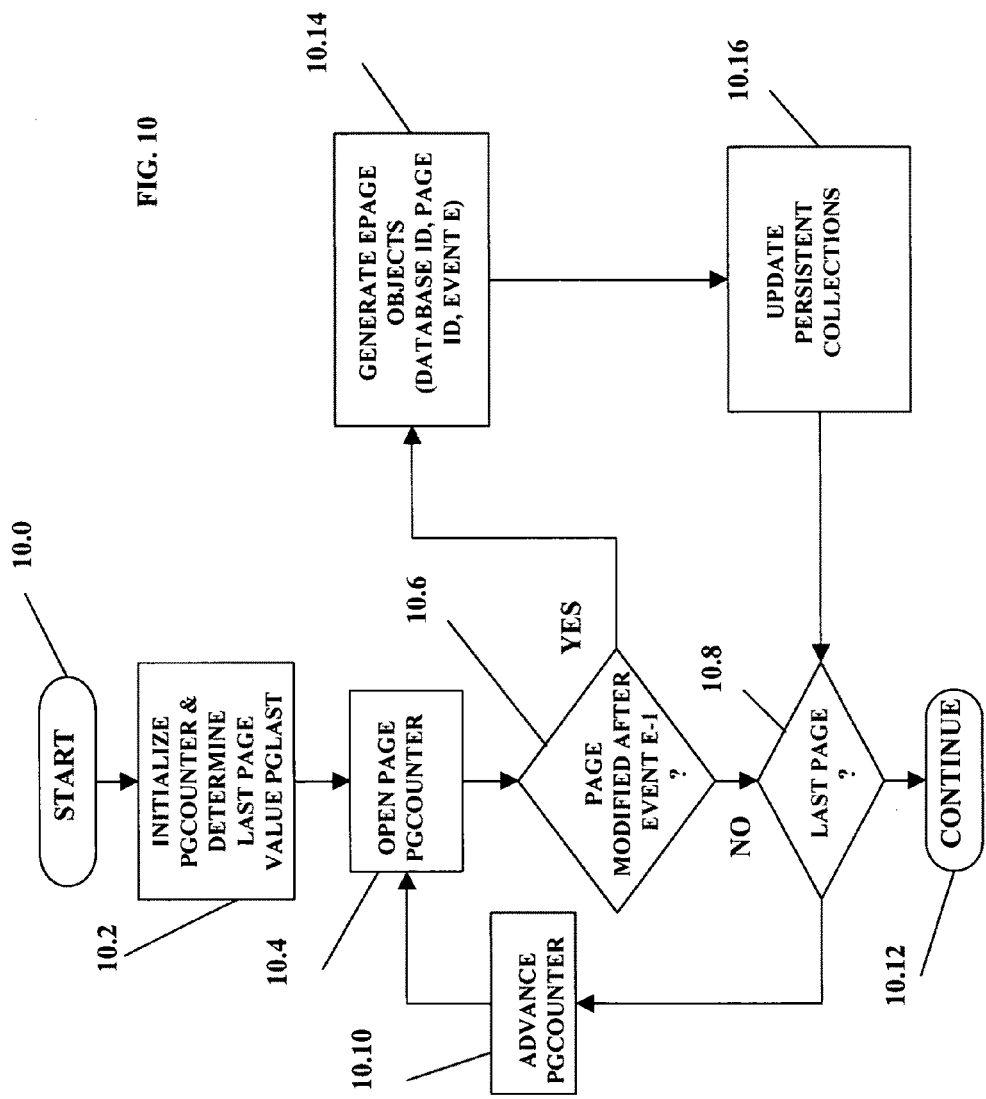
FIG. 10 is a flowchart of optional operations of the DBMS of FIG. 1 wherein one or more page event objects may be generated as within the execution of the backup event process of FIG. 9.

Referring now generally to the Figures and particularly to FIG. 10, FIG. 10 is a flowchart of optional operations of the DBMS 2 wherein page event objects EPAGES 144.A-144.N are generated as within the execution of the backup event process E. In step 10.2 a page counter PGCOUNTER 142 is initialized to a beginning identification value of a plurality of pages comprised within a same database, and the last identification value PGLAST of the plurality of pages is determined. For example, the plurality of pages may include two hundred pages, wherein each page is sequentially assigned a unique identification value of the whole number series from 000 to 199, and in step 10.2 the PGCOUNTER 142 is initialized to the whole number 000 and the last value database identification PGLAST is set to equal 199 by the DBMS 2. In step 10.4 a page having an identification value equal to the current value of the page counter PGCOUNTER 142 (i.e., page assigned a serial number equal to the current value of PGCOUNTER 142) is opened by the DBMS 2, and the opened page PGCOUNTER 142 is examined by the DBMS 2 in step 10.6 to determine whether any component of the opened page PGCOUNTER 142 (e.g., an object, or record) has been modified after a most recent backup process E-1. If the page PGCOUNTER 142 selected in the most recent execution of step 10.4 is determined in step 10.6 to not have been updated or modified since the execution of the earlier backup process E-1, the DBMS 2 proceeds on to step 10.8 to determine whether the page counter PGCOUNTER 142 is equal to the last value page identification DB LAST, whereby the DBMS 2 determines whether each and every page of the plurality of pages has been examined in an execution of step 10.6. When the DBMS 2 determines in step 10.8 that the page counter PGCOUNTER 142 is not equal to the last value page identification PGLAST, the DBMS 2 proceeds from step 10.8 to step 10.10 to advance the page counter PGCOUNTER 142 to a value closer to the last page identification value PGLAST (e.g., increment or decrement the page counter PGCOUNTER 142), and from step 10.10 to a succeeding execution of step 10.4. When the DBMS 2 determines in step 10.8 that the page counter PGCOUNTER 142 is equal to the last value page identification PGLAST, the DBMS 2 proceeds from step 10.8 to step 10.12 and to perform alternate computational operations.

If the page PGCOUNTER 142 selected in the most recent execution of step 10.4 is determined in step 10.6 to have been updated or modified since the execution of the most recent backup process E-1, the DBMS 2 proceeds from step 10.4 and on to step 10.14 and to generate a new page revision object EPAGE 144.A, wherein the page revision object EPAGE 144.A includes (1.) an identifier PAGE ID of the of the page PGCOUNTER 142 examined in step 10.6; (2.) an object identifier EPAGE OID of the page revision object EPAGE 144.A being generated in step 10.14 itself; (3.) an identifier of the current backup event process EVENT E; (4.) an optional time date stamp of the time and date that the instant page PGCOUNTER 142 was most recently updated; and (5.) the contents of the page PGCOUNTER 142 at the time of the execution of the current backup event process E (e.g., all of the objects O.1-O.N and all other data comprised within the page PGCOUNTER 142). The page revision object EPAGE 144.A may be stored in the system memory 126 of the federated computer 110.

In step 10.16 the DBMS 2 updates any persistent collections (e.g., the persistent incremental database backup event collection object DB EVENT E 148.A generated in step 9.14) that are established to track, manage or comprise the newly generated EPAGE's 144.A-144.N. The update of persistent collections of step 10.16 may includes writing (a.) the object identifier EPAGE OID of the page revision object EPAGE 144.A generated in step 10.14; and/or (b.) the entire page revision object EPAGE 144.A generated in step 10.14. The DBMS 2 proceeds on from step 10.16 to step 10.8.

Figure 11:
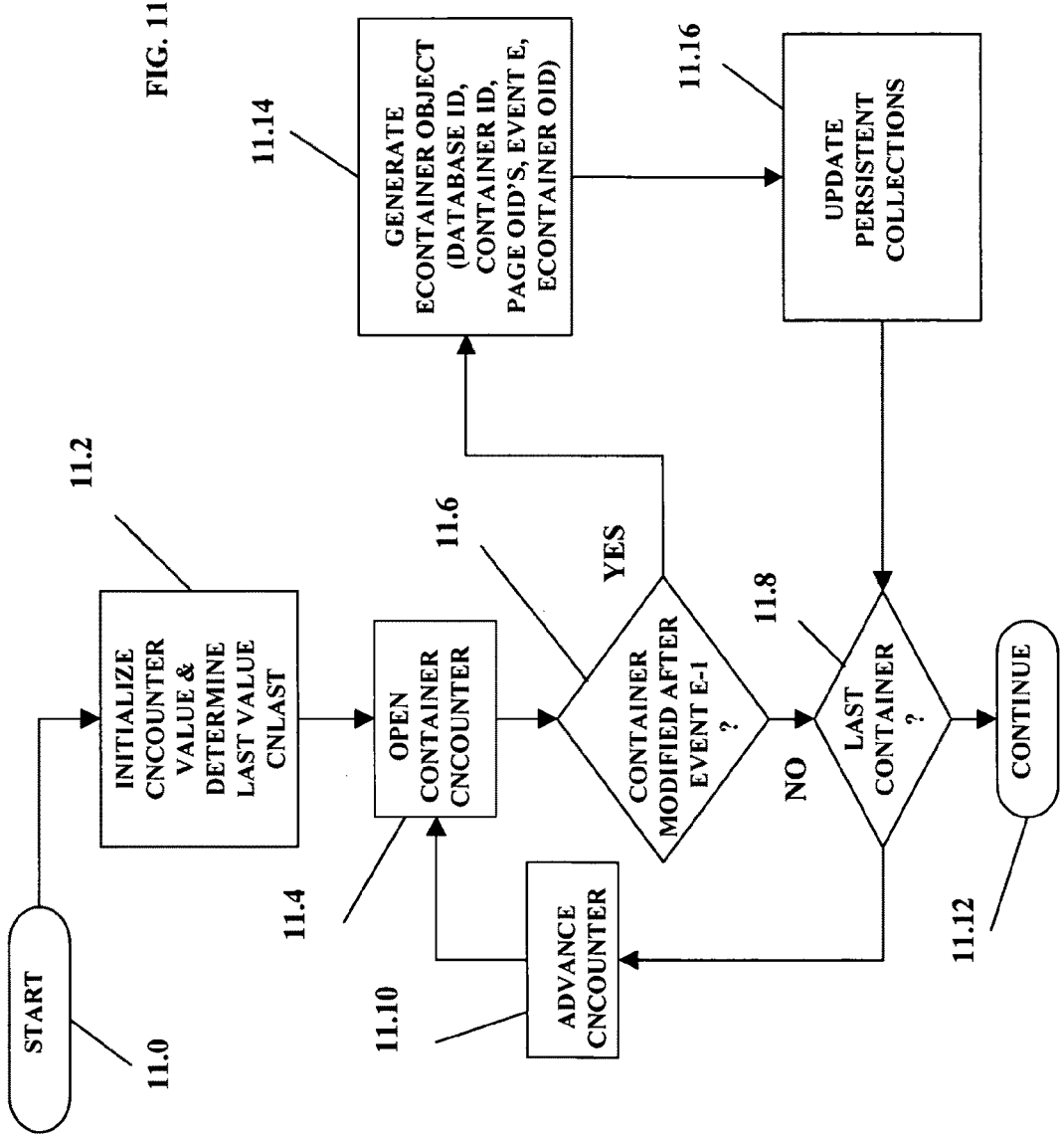
FIG. 11 is a flowchart of optional operations of the DBMS of FIG. 1 wherein one or more container event objects may be generated as within the execution of the backup event process of FIG. 9.

Referring now generally to the Figures and particularly to FIG. 11, FIG. 11 is a flowchart of optional operations of the DBMS 2 wherein container event objects ECONTAINERS 152.A-152.N are generated as a result of the backup event process E. In step 11.2 a container counter CNCOUNTER is initialized to a beginning identification value of a plurality of containers comprised within a same database, and the last identification value CNLAST of the plurality of containers is determined. For example, the plurality of containers may include one hundred containers, wherein each container is sequentially assigned a unique identification value of the whole number series from 00 to 99, and in step 11.2 the CNCOUNTER is initialized to the whole number 00 and the last value database identification CNLAST is set to equal 99 by the DBMS 2.

In step 11.4 a container having a container identification value equal to the current value of the container counter CNCOUNTER is opened by the DBMS 2 (i.e., container CNCOUNTER), and the opened container is examined by the DBMS 2 in step 11.6 to determine whether any component of the instant container (e.g., a page, object, or record comprised within the instant container) has been modified after a most recent backup process E-1. If the container CNCOUNTER selected in the most recent execution of step 11.4 is determined in step 11.6 to not have been updated or modified since the execution of the earlier backup process E-1, the DBMS 2 proceeds on to step 11.8 to determine whether the container counter CNCOUNTER is equal to the last container identification value DB LAST, whereby the DBMS 2 determines whether each and every container of the plurality of containers has been examined in an execution of step 11.6. When the DBMS 2 determines in step 11.8 that the container counter CNCOUNTER is not equal to the last container identification value CNLAST, the DBMS 2 proceeds from step 11.8 to step 11.10 to advance the container counter CNCOUNTER to a value closer to the last container identification value CNLAST (e.g., increment or decrement the container counter CNCOUNTER), and from step 11.10 to a succeeding execution of step 11.4. When the DBMS 2 determines in step 11.8 that the container counter CNCOUNTER is equal to the last container identification value CNLAST, the DBMS 2 proceeds from step 11.8 to step 11.12 and to perform alternate computational operations.

If the container CNCOUNTER selected in the most recent execution of step 11.4 is determined in step 11.6 to have been updated or modified since the execution of the most recent backup process E-1, the DBMS 2 proceeds from step 11.4 and on to step 11.14 and to generate a new container revision object ECONTAINER 152.A, wherein the container revision object ECONTAINER 152.A includes (1.) an identifier CONTAINER ID of the container CNCOUNTER examined in step 11.6; (2.) an object identifier ECONTAINER OID of the container revision object ECONTAINER 152.A being generated in step 11.14 itself; (3.) an identifier of the current backup event process EVENT E; (4.) an optional time date stamp of the time and date that the instant container CNCONTAINER 150 was most recently updated; and (5.) the contents of the instant container CNCONTAINER 150 at the time of the execution of the current backup event process E (e.g., all of the pages, objects O.1-O.N and all other data comprised within the container CNCONTAINER 150 at the time of the execution of the current backup process of event E. The container revision object ECONTAINER 152.A may be stored in the system memory 126 of the federated computer 110.

In step 11.16 the DBMS 2 updates any persistent collections that are established to track or comprise the newly generated container revision object ECONTAINER 152.A of step 11.14, one or more persistent database backup collection object DB EVENT E 148.A.

The update of persistent collections of step 11.16 may includes writing into one or more persistent database backup collection objects DB EVENT E's 148.A-148.N (a.) the econtainer object identifier ECONTAINER OID of the container revision object ECONTAINER 152.A generated in step 11.14; and/or (b.) the entire container revision object ECONTAINER 152.A generated in step 11.14. The DBMS 2 proceeds on from step 11.16 to step 11.8.

Figure 12:
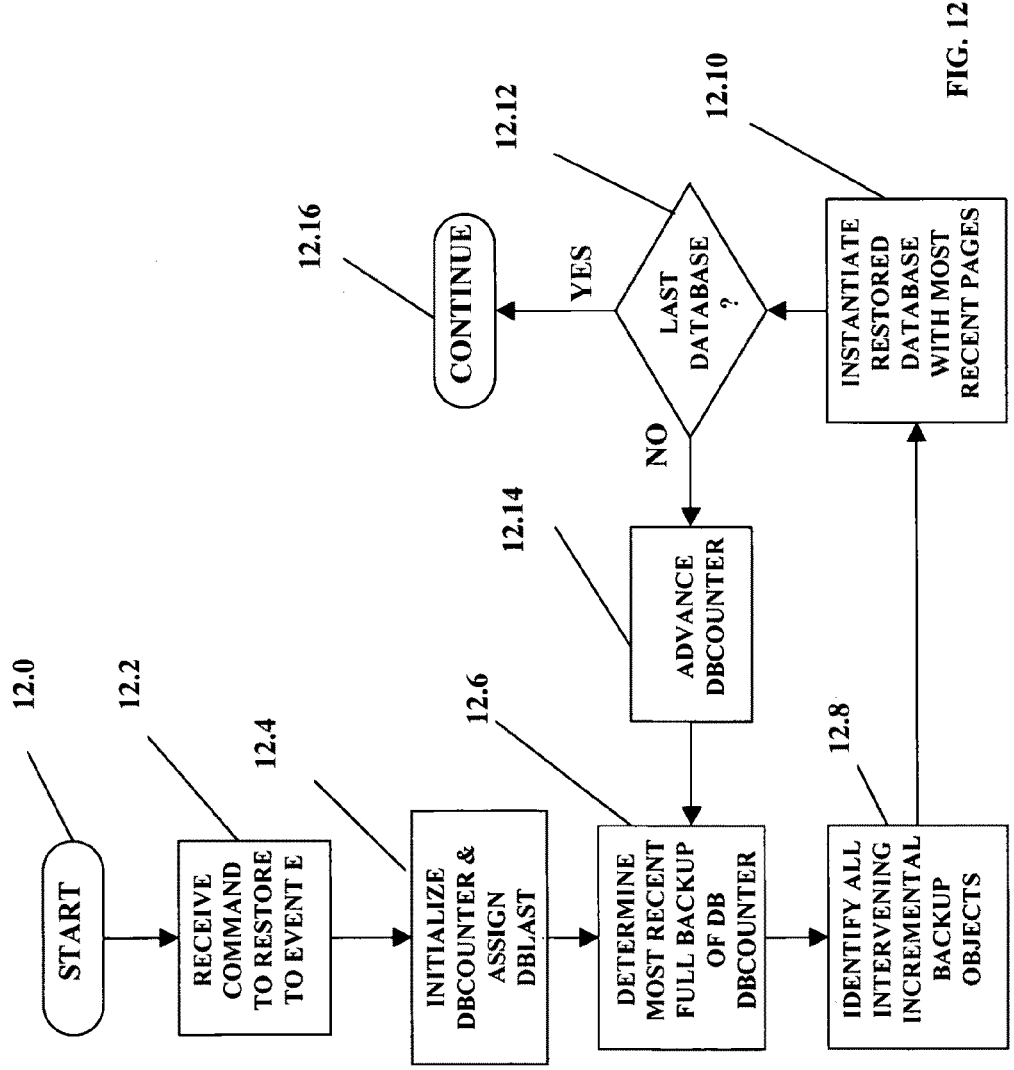
FIG. 12 is a is a flowchart of optional operations of the DBMS of FIG. 1 wherein one or more databases of FIG. 1 may be restored by applying (1.) one or more backup databases of FIG. 1; (2.) one or more persistent incremental database backup collection objects of FIG. 9; (3.) one or more page backup event objects of FIG. 10; and/or (4.) one or more collection backup event objects of FIG. 11.

Referring now generally to the Figures and particularly to FIG. 12, FIG. 12 is a flowchart of optional operations of the DBMS 2 wherein one or more databases are restored within a restoration process. In step 12.2 the DBMS 2 receives or generates command to restore the plurality of databases of the process of FIG. 9. It is understood that the restoration process of FIG. 12 may be modified to limit database restoration to a selection or range of databases comprised with the plurality of databases of the process of FIG. 9, or to only one database comprised with the plurality of databases of the process of FIG. 9. In step 10.2 the database counter DBCOUNTER 146 is initialized to a beginning database identification value of the plurality of databases, or a selection or range thereof, and the last database identification value DBLAST is made equal to the last database identification value of the database(s) to be restored in the current execution of the process of step 12.4 by the DBMS 2. In step 12.6 the most recent full backup of the database DBCOUNTER 146 is determined by searching the DBMS 2 and/or the communications network 106, and the backup process wherein the selected most recent full backup was generated is set at the most recent previous backup event E-1. In step 12.8 the communications network 106 is searched for all persistent incremental database backup event collections DB EVENT E 148.A-148.N that were generated in backup events occurring after the most recent full backup event E-1, and in step 12.10 the database DBCOUNTER selected in the most recent execution of step 12.4 is stored by instantiating the most recent full backup with the more recent page (and optionally container) data contained in and/or referenced by the persistent incremental database backup event collections DB EVENT located in step 12.8.

The DBMS 2 proceeds on from step 12.10 to step 12.12 to determine whether the database counter DBCOUNTER 146 is equal to the last database identification value DBLAST, whereby the DBMS 2 determines whether each and every database of the plurality of databases to be restored according to the restore command of step 12.2 has been processed in an execution of steps 12.6 through 12.10.

When the DBMS 2 determines in step 12.12 that the database counter DBCOUNTER 146 is not equal to the last database identification value DBLAST, the DBMS 2 proceeds from step 12.12 to step 12.14 to advance the database counter DBCOUNTER 146 to a value closer to the last database identification value DBLAST (e.g., increment or decrement the database counter DBCOUNTER 146), and from step 12.6 to perform a succeeding execution of steps 12.6 through 12.12. When the DBMS 2 determines in step 12.12 that the database counter DBCOUNTER is equal to the last database identification value DBLAST, the DBMS 2 proceeds from step 12.12 to step 12.16 and to perform alternate computational operations.

Figure 13:
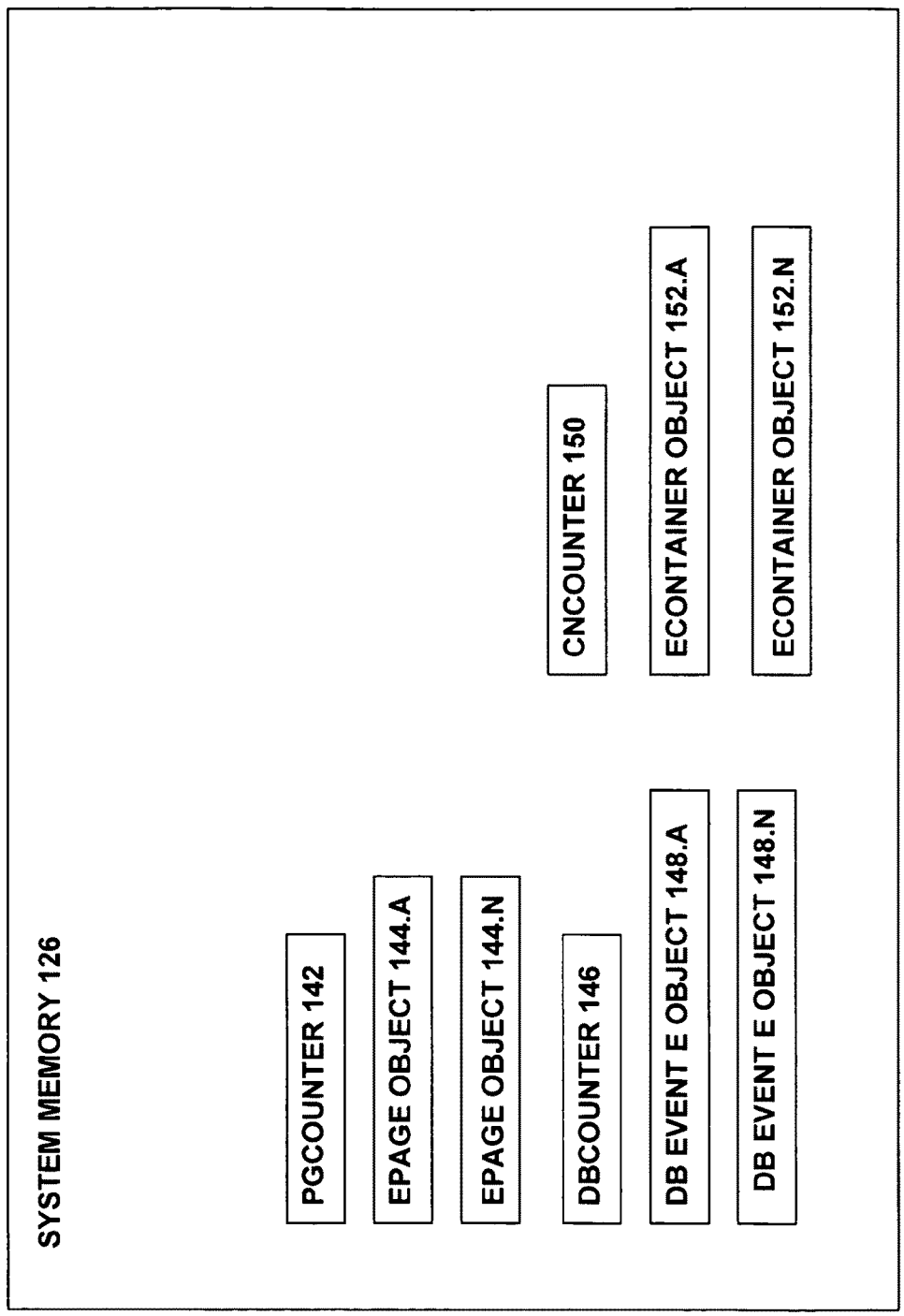
FIG. 13 is a representation of software objects and encoded values as stored in the system memory of the computer of FIGS. 7 and 8.

Referring now generally to the Figures and particularly to FIG. 13, FIG. 13 is a representation of software objects and encoded values 142-152.N as stored in the system memory 126. It is understood that each of the software objects and encoded values 142-152.A may be stored and accessible throughout the network 106 in certain still additional aspects of the Method of the Present Invention.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

The invention claimed is:

1. In an information technology system, a method of backing up data contained in a federated software database comprising a plurality of software databases each database comprising a plurality of pages of software objects, the method comprising:
   creating, by a processor, an initial backup populated with a full backup of the federated database;
   setting, by the processor, a backup event counter to an initial event value;
   creating, by the processor, an initial backup collection associated with the initial event value, wherein each backed-up object is sorted by database number and page number;
   updating, by the processor, a plurality of objects of the federated database;
   updating, by the processor, the backup event counter to a first event value;
   generating, by the processor, a first incremental backup by storing each page having an object that was updated after the initial backup process into a first incremental backup; and
   creating, by the processor, a first incremental backup collection associated with the first event value, wherein each backed-up object of the first incremental backup is sorted by database number and page number, whereby an individual database or page may be restored by reference to the initial backup collection and the first incremental backup collection.

2. The method of claim 1, further comprising:
   updating the backup event counter to a second event value;
   generating a second incremental backup by storing each page having an object that was updated after first incremental backup process;

creating a second incremental backup collection associated with the second event value, wherein each backed-up object of the second incremental backup is sorted by database number and page number, whereby an individual database or page may be restored by reference to the initial backup collection and the first incremental backup collection.

3. The method of claim 1, further comprising:
organizing separate pluralities of pages within each database into containers;
assigning unique container identifiers, each container identifier unique with a comprising database;
expanding the initial backup collection and the first incremental backup collection to include container numbers of each stored page; and
additionally sorting the initial backup collection and the first incremental backup by container identifiers, whereby an individual database or page may be restored by reference to the initial backup collection and the first incremental backup collection.

4. The method of claim 1, further comprising:
capturing a time stamp of each backup population event;
expanding the initial backup collection and the first incremental backup collection to include a relevant time stamp of backup generation; and
additionally sorting the initial backup collection and the first incremental backup by time stamp, whereby an individual database or page may be restored by reference to the initial backup collection and the first incremental backup collection.

5. The method of claim 1, further comprising:
assigning an initial database version number to each database upon creation of the initial backup;
incrementing each database version number when a software object comprised with an associated database is updated;
expanding the initial backup collection and the first incremental backup collection to include the initial database version number of each stored page; and
additionally sorting the initial backup collection and the first incremental backup by data base version number, whereby an individual database or page may be restored by reference to the initial backup collection and the first incremental backup collection.

6. The method of claim 1, further comprising:
assigning an initial page version number to each page upon creation of the initial backup;
incrementing each page version number when a software object comprised with an associated page is updated;
expanding the initial backup collection and the first incremental backup collection to include the page version number of each stored page; and
additionally sorting the initial backup collection and the first incremental backup by page version number, whereby an individual database or page may be restored by reference to the initial backup collection and the first incremental backup collection.

7. The method of claim 1, further comprising:
assigning an unique object identifier to each object;
expanding the initial backup collection to include the unique object identifier of each stored object;
expanding the first incremental backup collection to include the unique object identifier of each stored object; and
additionally sorting the initial backup collection and the first incremental backup by unique object identifier, whereby an individual database or page may be restored by reference to the initial backup collection and the first incremental backup collection.

8. The method of claim 1, further comprising compressing each stored page for storage in the initial backup.

9. The method of claim 1, further comprising compressing each stored page for storage in the first incremental backup.

10. The method of claim 1, further comprising:
sequentially generating a plurality of incremental backups, each incremental backup comprising a plurality of pages containing objects having been updated after the most recent incremental backup generation and before the generation of the instant incremental backup; and
generating a dedicated incremental backup collection for each incremental backup, each dedicated incremental backup containing, wherein each backed-up object of the incremental backups and the initial backup collection are sorted by database number and page number, whereby an individual database or page may be restored by reference to the initial backup collection, the first incremental backup collection, and the dedicated incremental backup collections.

11. The method of claim 10, further comprising:
capturing a time stamp of each backup population event;
expanding the initial backup collection, the first incremental backup collection and each dedicated incremental backup collection to include a relevant time stamp of backup generation; and
additionally sorting the initial backup collection, the first incremental collection and each dedicated incremental backup collection by time stamp values, whereby an individual database or page may be restored by reference to the initial backup collection, the first incremental backup collection, and the dedicated incremental backup collections.

12. The method of claim 10, further comprising:
assigning an initial database version number to each database upon creation of the initial backup;
incrementing each database version number when a software object comprised with an associated database is updated;
expanding the initial backup collection, the first incremental backup collection and each dedicated incremental backup collection to include the database version number of each stored page; and
additionally sorting the initial backup collection, the first incremental collection and each dedicated incremental backup collection by the database version number of each stored page, whereby an individual database or page may be restored by reference to the initial backup collection, the first incremental backup collection, and the dedicated incremental backup collections.

13. The method of claim 10, further comprising:
assigning an initial page version number to each page upon creation of the initial backup;
incrementing each page version number when a software object comprised with an associated page is updated;
expanding the initial backup collection, the first incremental backup collection and each dedicated incremental backup collection to include the page version number of each stored page; and
additionally sorting the initial backup collection, the first incremental collection and each dedicated incremental backup collection by the page version number of each stored page, whereby an individual database or page may be restored by reference to the initial backup collection, the first incremental backup collection, and the dedicated incremental backup collections.

14. The method of claim 10, further comprising:
assigning an unique object identifier to each object;
expanding the initial backup collection, the first incremental backup collection and each dedicated incremental backup collection to include the unique object identifier of each stored object; and
additionally sorting the initial backup collection, the first incremental collection and each dedicated incremental backup collection by the unique object identifier of each stored object, whereby an individual database or page may be restored by reference to the initial backup collection, the first incremental backup collection, and the dedicated incremental backup collections.

15. A non-transitory computer-readable medium, the non-transitory computer-readable medium comprising machine-readable, software encoded instructions to direct an information technology system to:
create an initial backup populated with a full backup of the federated database;
set a backup event counter to an initial event value;
create an initial backup collection associated with the initial event value, wherein each backed-up object is sorted by database number and page number;
update a plurality of objects of the federated database;
update the backup event counter to a first event value;
generate a first incremental backup by storing each page having an object that was updated after the initial backup process into a first incremental backup; and
create a first incremental backup collection associated with the first event value, wherein each backed-up object of the first incremental backup is sorted by database number and page number, whereby an individual database or page may be restored by reference to the initial backup collection and the first incremental backup collection.

\* \* \* \* \*